May 27, 1941.  E. W. MENKE  2,243,434
REFLECTOR
Filed April 25, 1938   2 Sheets-Sheet 1
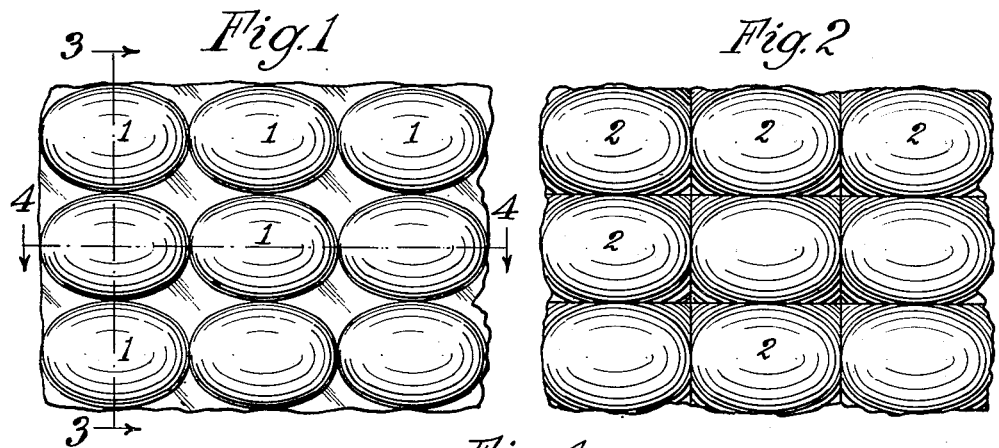
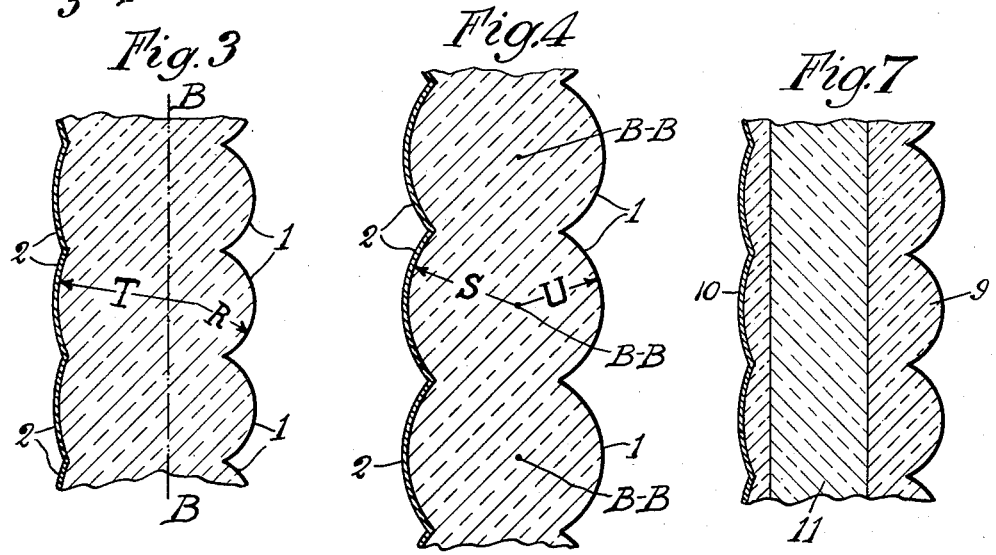
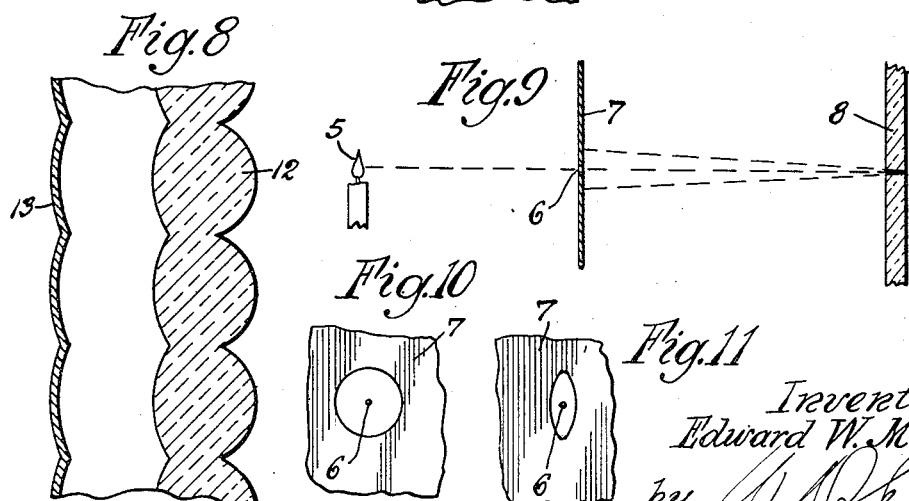
Inventor
Edward W. Menke
by
Attorney.

May 27, 1941.  E. W. MENKE  2,243,434
REFLECTOR
Filed April 25, 1938   2 Sheets-Sheet 2
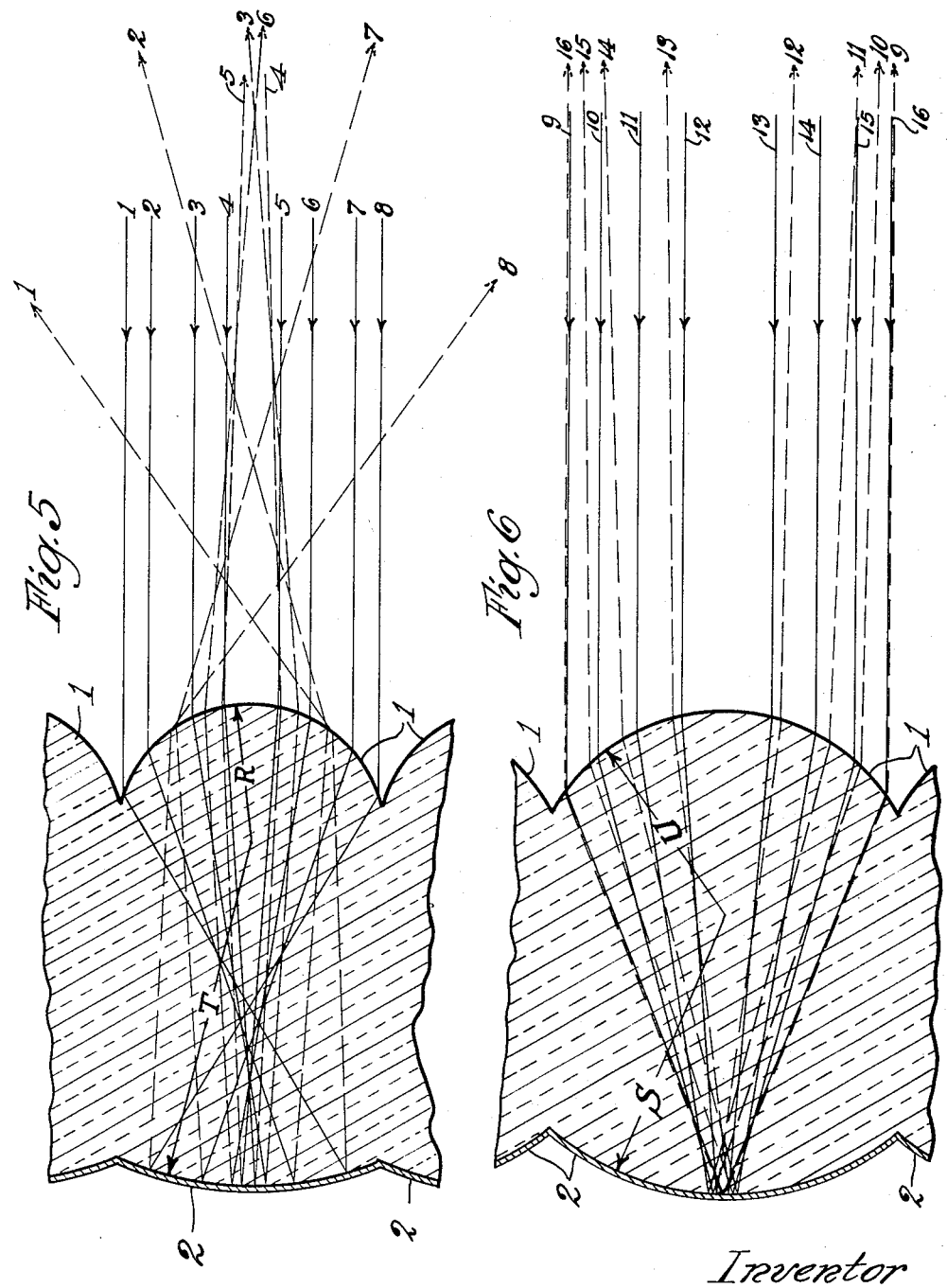
Inventor
Edward W. Menke
by
Attorney.

Patented May 27, 1941

2,243,434

UNITED STATES PATENT OFFICE 2,243,434

REFLECTOR

Edward W. Menke, Chicago, Ill.

Application April 25, 1938, Serial No. 203,983

10 Claims. (Cl. 88—82)

The present invention relates to light-reflecting means in general and particularly to such means of a type which redirect incident light rays in a predetermined pattern. More specifically the invention comprises light reflecting means having objective lenses and reflecting lenses which are so designed and related that the incident light rays are reflected in a restricted pattern in one dimension and are reflected in a diverging design at right angles thereto. Such means find particular usefulness in roadside markers, etc. in which a wide divergence of reflected light in a vertical plane is desirable while such a divergence in a horizontal plane is unnecessary.

Referring now to the drawings, in which preferred embodiments of the invention are illustrated:

Figure 1 is a front view of a reflector constructed in accordance with the invention and illustrates the objective lenses;

Figure 2 is a back view of the reflector of Figure 1 and illustrates the reflecting lenses;

Figure 3 is a vertical section upon the line 3—3 of Figure 1;

Figure 4 is a horizontal section upon the line 4—4 of Figure 1;

Figure 5 is a diagrammatic illustration of the reflection of light rays in a vertical plane;

Figure 6 is a diagrammatic illustration of the reflection of light rays in a horizontal plane;

Figure 7 is a section thru a modification of the reflector constructed in accordance with the present invention in which the reflector body is formed of a plurality of laminations or layers of transparent material such as glass;

Figure 8 is a section thru a second modification and in which the objective lens is spaced by air from the reflecting surface;

Figure 9 illustrates diagrammatically the reflection of a pencil of light from an ordinary plane reflector;

Figure 10 illustrates the shape of the reflected image;

Figure 11 illustrates the reflected image of the same pencil of light when reflected by an objective lens and its reflector constructed in accordance with the present invention.

Reflectors of light are today much used as danger signs, direction signs and advertising signs along the highways. Such signs are usually placed closely adjacent the boulevard where they face the oncoming automobile and especially the headlights thereof. The reflecting areas are so disposed or exposed as to convey intelligence to the observer, or the reflector may be colored so that its very presence serves as a warning.

In the common automobile or truck there is a vertical displacement between the headlights and the eyes of the driver. This distance varies and is usually greater in trucks than in pleasure cars. It is necessary, then, in order that the car driver receive reflected light from the reflecting sign that the incident light rays from his own headlights be reflected upwardly at an angle. Obviously this angle will change in any given instance as the car approaches the sign, the vertical displacement described subtending an increasingly greater angle as the car approaches the sign. According to the present invention the reflector is so constructed that the reflected rays diverge and are directed to the driver at all heights above the light source at all distances from the sign.

In the horizontal plane, however, practically no divergence of the reflected rays is necessary or desirable. The driver is seated directly in the rear of the lights so that reflected rays that are returned in the direction of the light source will be received by him. This restriction results in greater brilliance of the reflected light and permits of the separation horizontally of the light rays as reflected by the individual objective lenses of the reflector. In the reflector constructed in accordance with the present invention this desirable horizontal restriction of the reflected rays is present.

Referring again to the drawings, and in particular to Figures 1 to 4, inclusive, the first preferred embodiment of the invention is illustrated. The reflector is seen to comprise a plate of glass, or similar transparent material which can ordinarily be substituted for glass. Upon one side of the plate are formed a plurality of objective lenses, each lens being indicated by the reference character 1, while upon the opposite side directly opposing the objective lenses are a plurality of reflectors each of which is indicated by the reference character 2 and which comprises a coating of reflecting material, such as silver or aluminum, upon the shaped plate surface. The objective lenses and reflectors are contoured and positioned in a definite manner.

Each objective lens 1 is in fact a section of a ring of circular cross-section which is intersected by a plane which extends parallel to the major axis of the ring and which also passes thru a chord of the ring. Each lens 1 can be considered to have a surface described by a sector of a vertical circle having a radius R when swung about a vertical axis B—B. In Figure 3, which illustrates a vertical section, each axis of revolution B—B is seen to be positioned between the objective lens and its reflector and to be common for the vertical row of lenses. In Figure 4, which illustrates an horizontal section, it is seen that the axes B—B are horizontally spaced for the various vertical rows of lenses. In the same figure the letter U indicates the radial distance from the axis B—B which spaces the mid-point of the sector of the vertical circle having the radius R in Figure 3.

The reflector for each objective lens is formed similarly to that lens with the difference that the various radii of the reflector surface are greater in each instance. The radius T of the vertical curvature is greater than the corresponding lens radius R and the radius S which separates the reflector from the axis of rotation B—B is greater than the corresponding lens radius U in any given horizontal plane. In general U is greater than R, S is greater than U, and T is greater than S. These various distances can and will vary with various plate substances and various indices of refraction. As one example, using a glass having an index of refraction of 1.512, where the radius R had the value of 1 unit the other radii had the following values: U=1.48; T=2.5; and S=2.02. In a second example with a glass having an index of refraction of 1.754 the radii values were in the following proportions: R=1; T=1.937; U=1.437; S=1.5. It is critical that the summation of radii U and S should equal, or substantially equal, the focal length of the objective lens in the horizontal plane. The objective lenses 1 and the reflectors 2 are seen to be, in Figure 3, of equal height.

Referring now to Figures 9, 10 and 11 in particular the type of reflected image which is desired and which is produced by the reflector comprising the present invention is compared with the commonly reflected image. In Figure 9 a pencil of light from candle flame 5 passes thru a small circular aperture 6 in a plate 7 and is reflected back to that plate by a flat coated reflector 8. As illustrated in Figure 10 the reflected image is circular, the light being reflected from the reflector as a cone as is illustrated in Figure 9. In Figure 11 is illustrated the shape of the image which would have been reflected on plate 7 had a single lens and its reflector, constructed in accordance with the present invention been substituted for the flat reflector 8. The image is restricted horizontally and is diverged vertically.

The manner in which each reflecting unit constructed in accordance with the present invention reflects incident light rays to produce the image illustrated in Figure 11 is shown diagrammatically in Figures 5 and 6. In Figure 5 is illustrated the incidence and reflection of a multiplicity of light pencils in a vertical plane. The incident ray is denoted by a solid line while its reflection is indicated by a broken line, both lines bearing the same number. The incoming rays 1 to 8, inclusive, enter parallel to one another, are deflected at various angles depending upon their angles of incidence with the lens surface and upon the index of refraction of the glass and are reflected upon striking the mirror surface of the reflector. This surface they also strike at various angles and so are reflected at various angles back to the objective lens to diverge in a vertical plane upon leaving the exterior surface thereof. As the lenses are arranged in vertical as well as horizontal series the reflected rays in a vertical plane from each vertical series will merge.

In Figure 6 the incidence and reflection of light rays in a horizontal plane, that is at right angles to the plane of Figure 5, is diagrammatically illustrated. Again the incident ray is indicated by a solid line and the reflected ray by a broken line. Here, however, as the summation of the radii U and S is substantially equal to the focal length of the lens in a given horizontal plane it is obvious that the incoming rays will be reflected back to their source. This is evident by observing the various full line incident rays 9 to 16, inclusive, and their reflected dotted line rays bearing the same reference characters. In each case the reflected ray extends substantially parallel to the incident ray but upon the opposite side of the lens center.

Referring now to Figures 7 and 8 in particular two preferred modifications of the present invention are illustrated. In Figure 7 the reflector is formed of laminations of transparent material such as glass. The lenses 9 and the reflectors 10 are formed just as in the first embodiment but the bodies of which they are formed are spaced by a central plate or lamination 11. In Figure 8 the lenses 12 are spaced from the metallic reflectors 13 by air alone, the distance therebetween being maintained by any conventional supporting means.

I claim:

1. In a light reflector, an objective lens the surface of which is described by the rotation of a segment of a circle about an axis at a radius unequal to the radius of the circle and which is delimited by the intersection therewith of a plane parallel to said axis, a reflector spaced rearwardly from said lens the surface of which is described by the rotation of a segment of a circle of larger diameter than said first circle about the same axis and at a distance therefrom such that the summation of the radii of rotation is substantially equal to the focal length of said lens with respect to incident light ray beams lying in a plane perpendicular to said axis.

2. In a light reflector, an objective lens the surface of which is described by rotating a segment of a circle about an axis, the radius of rotation being unequal to the radius of the circle, a reflector spaced rearwardly from said lens the surface of which is described by rotating a segment of a second circle about the same axis and at a distance therefrom such that the summation of the radii of rotation is substantially equal to the focal length of said lens in a plane perpendicular to said axis, the radius of said second circle being such that the summation of the circle radii does not equal the focal length of said lens in a plane containing said axis, said lens and said reflector surface being spaced by an intermediate transparent medium.

3. In a light reflector, an objective lens the surface of which is described by rotating a segment of a circle about an axis, the radius of rotation being unequal to the radius of the circle, a reflector spaced rearwardly from said lens the surface of which is described by rotating a segment of a second circle about the same axis and at a distance therefrom such that the summation of the radii of rotation is substantially equal to the focal length of said lens in a plane perpendicular to said axis, the radius of said second circle being such that the summation of the circle radii does not equal the focal length of said lens in a plane containing said axis, said lens and said reflector surface being spaced by an intermediate air space.

4. An autocollimating reflex device comprising a convex objective lens and a concave reflector apposed thereto, said lens and said reflector being concentric about a common axis, the summation of the radii substantially equaling the focal length of said lens with respect to incident light rays in a plane perpendicular to said axis, said lens and said reflector being circular in cross-section and concentric in a plane perpendicular to said first-mentioned plane and having radii in said last-mentioned plane unequal to those first-mentioned the summation thereof being unequal to the focal length of the lens with respect to incident light rays in said last-mentioned plane, whereby incident light rays are reflected with divergence in said last-mentioned plane and are reflected in paths parallel to their original paths in said first-mentioned plane.

5. In a light reflector, an objective lens the surface of which is described by rotating a part of a circle about an axis at a radius unequal to the radius of the circle, and a reflector in the rear of said lens the surface of which is formed by rotating a part of a circle about an axis parallel to the said first mentioned axis and at a radius unequal to the radius of the circle, said reflector surface being spaced from said lens surface by a distance substantially equal to the focal length of said lens in a plane perpendicular to the said axis of rotation of said lens and by a distance unequal to the focal length of said lens in a second plane containing said axis of rotation, whereby incident light rays in said perpendicular plane are reflected in paths parallel to their original paths and incident light rays in said second plane are reflected in non-parallel paths.

6. In a light reflector, an objective lens the surface of which is described by rotating a segment of a circle about an axis at a radius unequal to the radius of the circle, a reflector spaced rearwardly from said lens the surface of which is described by rotating a segment of a circle about the same axis and at a distance therefrom such that the summation of the radii of rotation is substantially equal to the focal length of said lens whereby incident light rays in a plane perpendicular to said axis are reflected in paths parallel to their original paths while rays in a second plane at right angles to the first are reflected at an angle to their original paths.

7. In a light reflector, a glass plate having formed upon one of its sides a plurality of objective lenses the surface of each of which is described by rotating a segment of a circle about an axis which lies in a plane parallel to the plate and at a radius greater than the radius of the circle, and having formed upon its other side a plurality of reflectors opposing said lenses the surface of each of which is described by rotating a segment of a circle about an axis parallel to said first axis and at a radius less than the radius of the circle, each of said reflectors containing the focus of its opposing lens in a first plane and being spaced from said lens a distance unequal to the focal length thereof in a second plane perpendicular to the first plane, the said first planes of all the lenses and reflectors being parallel, whereby incident light rays in said first planes are reflected in paths parallel to their original paths and incident light rays in said second planes are reflected at an angle to their original paths.

8. In a light reflector, a glass plate having formed upon one of its sides a plurality of objective lenses the surface of each of which is described by rotating a segment of a circle about an axis which lies in a plane parallel to the plate and at a radius unequal to the radius of the circle, and having formed upon its other side a plurality of reflectors opposing said lenses the surface of each of which is described by rotating a segment of a circle about an axis parallel to said first axis and at a radius unequal to the radius of the circle, characterized in that the summation of the radii of rotation substantially equals the focal length of said lens with respect to incident light rays lying in a plane perpendicular to said axes, and in that the surfaces of the individual reflectors do not contain the foci of said lenses in planes containing said axes of rotation, and in that the axes of rotation of all the lenses and reflectors are parallel.

9. In a light reflector, a glass plate having formed upon one of its sides a plurality of objective lenses the surface of each of which is described by rotating a segment of a circle about an axis which lies in a plane parallel to the plate and at a radius unequal to the radius of the circle, and having formed upon its other side a plurality of reflectors opposing said lenses the surface of each of which is described by rotating a segment of a circle about an axis parallel to said first axis and at a radius unequal to the radius of the circle, said lenses and reflectors being arranged in rows and the axes of rotation of the various rows being parallel, characterized in that the summation of the radii of rotation of each pair of opposing lenses and reflectors is equal to the focal length of the objective lens with respect to light rays impinging in a plane perpendicular to the said axes of rotation and in that the individual reflectors do not contain the foci of said lenses with respect to light rays impinging in a plane parallel to said axes, whereby impinging light rays in said perpendicular plane are returned in parallel paths and impinging light rays in said parallel plane are returned in non-parallel paths.

10. In a light reflector, an objective lens the surface of which is described by rotating a part of a circle about an axis at a radius unequal to the radius of the circle, and a reflector in the rear of said lens the surface of which is formed by rotating a part of a circle about an axis parallel to the said first mentioned axis and at a radius unequal to the radius of the circle, said reflector surface containing the focus of said lens in a plane perpendicular to the said axes of rotation and being spaced from said lens a distance greater than the focal length thereof in a second plane containing said axes, whereby incident light rays in said perpendicular plane are reflected in paths parallel to their original paths and incident light rays in said second plane are reflected at an angle to their original paths.

EDWARD W. MENKE.